United States Patent [19]

Honeycutt, Jr.

[11] Patent Number: 4,662,566
[45] Date of Patent: May 5, 1987

[54] LOUVERED SEAL FLAP FOR FLAP-TYPE NOZZLE

[75] Inventor: Fred L. Honeycutt, Jr., Lake Park, Fla.

[73] Assignee: United Technologies Corporation, Hartford, Conn.

[21] Appl. No.: 804,022

[22] Filed: Dec. 2, 1985

[51] Int. Cl.$^4$ ............................................. F02K 1/06
[52] U.S. Cl. .............................. 239/265.39; 239/127.1
[58] Field of Search .................. 239/265.37, 265.39, 239/265.41, 127.1, 127.3

[56] References Cited

U.S. PATENT DOCUMENTS

| | | | | |
|---|---|---|---|---|
| 2,841,954 | 7/1958 | Rainbow | ....................... | 239/265.39 |
| 2,865,165 | 12/1958 | Kress | ............................. | 239/265.39 |
| 2,976,676 | 3/1961 | Kress | ............................. | 239/265.39 |
| 3,133,412 | 5/1964 | Westley | ........................ | 239/265.39 |
| 3,612,400 | 10/1971 | Johnson | ........................ | 239/265.41 |
| 3,972,475 | 8/1976 | Nelson et al. | ................. | 239/265.41 |

Primary Examiner—Andres Kashnikow
Assistant Examiner—Michael J. Forman
Attorney, Agent, or Firm—Stephen E. Revis; Jack N. McCarthy

[57] ABSTRACT

A flap for a jet engine flap-type nozzle is constructed of a plurality of sheet metal louver elements along the length of the flap, each louver element has a forward U-section having a forward flange and a rearward flange with an interconnecting bottom portion, a plate member extends rearwardly from the end of the rearward flange at the open end of the U-section, said plate member extending over the U-section of its adjacent louver element, said plurality of louver elements being connected together by welding the forward flange to the mating rearward flange, a beam plate extending axially along said U-sections and being fixed thereto, said plate members of adjacent louvers being free to move relative to each other.

9 Claims, 9 Drawing Figures

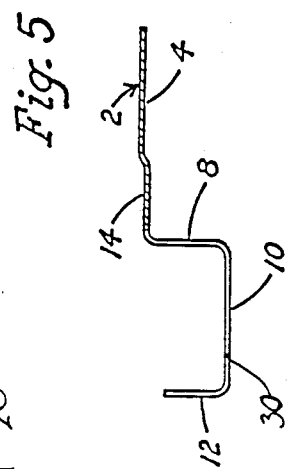
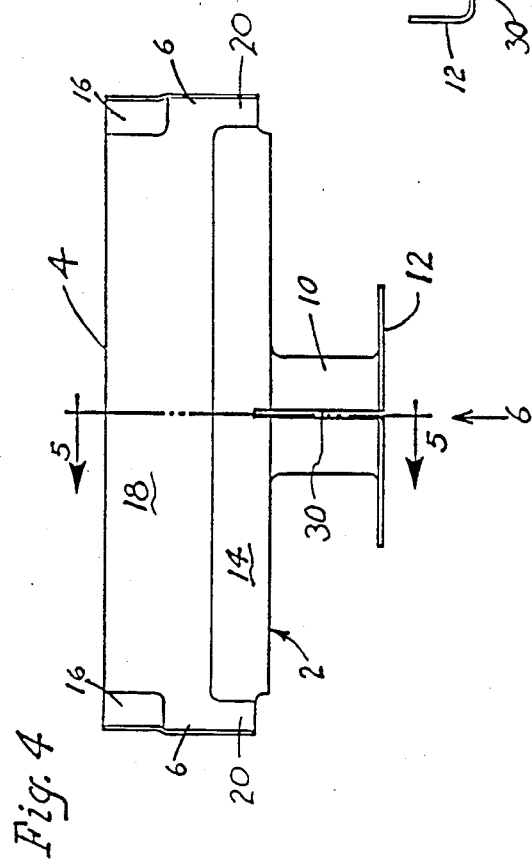
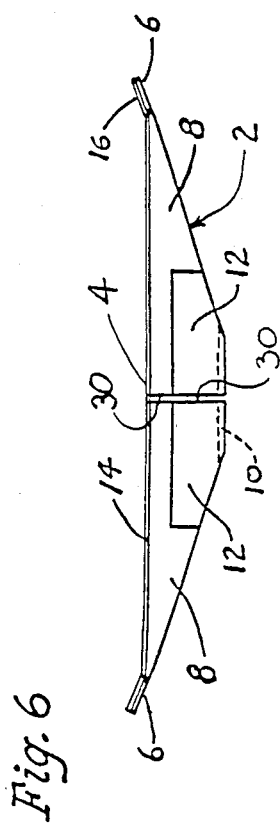

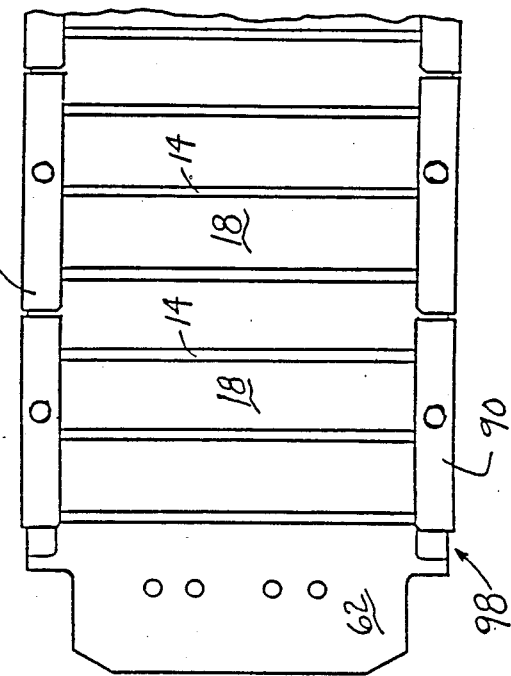
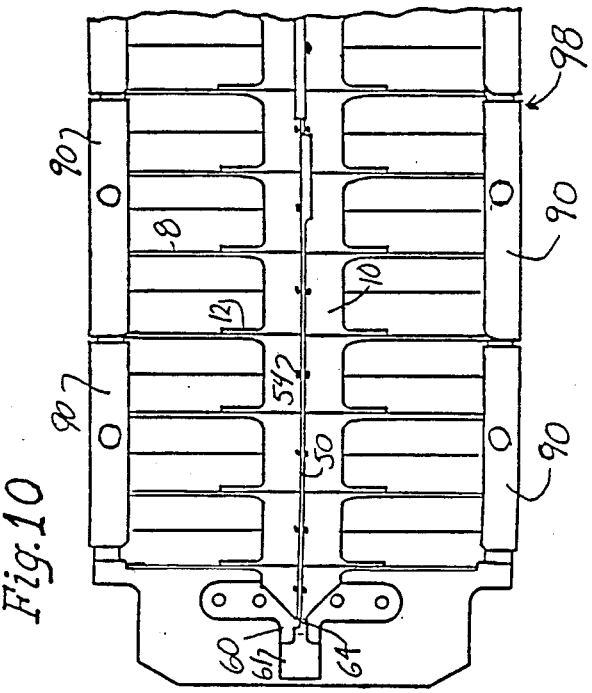

LOUVERED SEAL FLAP FOR FLAP-TYPE NOZZLE

DESCRIPTION

1. Cross Reference

An improvement to this type of flap construction is shown and claimed in a co-pending application Ser. No. 804,021, filed Dec. 2, 1985, filed herewith to Ronald L. Robinson et al for Louvered Seal Flap Edge Stiffener.

2. Technical Field

This invention relates to nozzle assembly flaps for a jet engine and especially to seal flaps for preventing leakage between flow directing flaps of an exhaust nozzle, where extremely high temperatures are encountered on one side and lower temperatures on the other.

3. Background Art

Flap-type exhaust nozzles are well known in the jet engine art and several patents representing them are set forth below; some of the nozzles show seal flaps which cooperate with the exhaust flow directing flaps to seal therebetween: U.S. Pat. Nos. 3,730,436; 3,792,815; 3,794,244; 3,820,720; 3,972,475; 3,979,065; 4,081,137; 4,456,178; and 4,544,098.

DISCLOSURE OF INVENTION

An object of the present invention is to provide a seal flap between two nozzle flaps to prevent leakage therebetween, said seal flap comprising a series of louver elements from one end to the other to reduce excessive buckling and wrinkling of the seal flap from high thermal environment.

Another object of the present invention is to form a flap of a longitudinal series of louver elements fixed together, each louver element having a rearwardly extending plate member, the rearward portion thereof forming a portion of the inner hot flow directing surface of the seal flap, said adjacent plate members having a part of their rearward portion overlapping the adjacent forward portion of the next downstream plate member; while plate members overlap, they are not welded or brazed to each other.

A further object of the present invention is to form a flap of a series of louver elements along its length, each element having a rearwardly extending plate member with an outwardly extending mid-flange connected to its forward end, a forwardly extending connecting plate connected to the outer end of said mid-flange, with said connecting plate having an inwardly extending front flange at its forward end; said front flange, connecting plate, and mid-flange forming a U-section and having a central cut, or slot, placed therethrough.

Another object of the present invention is to form a seal flap of a longitudinal series of louver elements, each louver element having the forward surface of an inwardly extending front flange having a central cut, welded to a cooperating outwardly extending mid-flange having a central cut, of its adjacent louver element, said central cuts being aligned, thereby being aligned with the central cut of the connecting plate, to provide a longitudinal cut for the length of the series of elements forming the seal flap; an elongated beam plate is placed in said longitudinal cut for the length of the seal flap, said beam plate being welded on each side to the connecting plate of each louver element and mating portions of each welded together front flange and mid-flange; this construction forms a continuous beam lengthwise in the center U-sections of the seal flap.

A further object of the present invention is to form each louver element with the rearwardly extending plate members contoured so that the rearward portion of the rearwardly extending plate member fits over the forward portion of the plate member of the adjacent louver element downstream thereof to prevent a stepped surface.

Another object of the present invention is to isolate portions of the plate members forming the inner hot flow directing surface of the seal flap from the elongated beam plate; the beam plate is cut out, such as by a semi-circular cut, or scallop, at each location where it would be adjacent that portion of a plate member forming the inner hot flow directing surface. This arrangement prevents thermally overstressing the beam.

Another object of the present invention is to provide a seal flap between two nozzle flaps to prevent leakage therebetween, said seal flap comprising a series of louver elements from one end to the other to permit a cooler fluid around the outer surfaces of the louver elements to be drawn between the louver elements over the hot inner surface.

BRIEF DESCRIPTION OF DRAWINGS

FIG. 4 is a top view of a single louver element of the divergent seal flap;

FIG. 5 is an enlarged view of the single louver element taken through line 5—5 of FIG. 4;

FIG. 6 is an end view of a single louver element of the divergent seal flap taken in the direction 6 of FIG. 4;

BEST MODE FOR CARRYING OUT THE INVENTION

Figure 3:
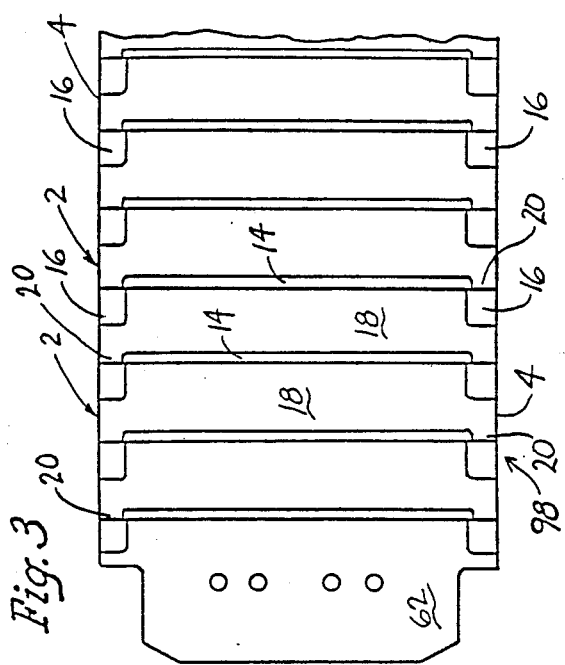
FIG. 3 is a top view of the forward part of the divergent seal flap shown in FIG. 1.
Figure 2:
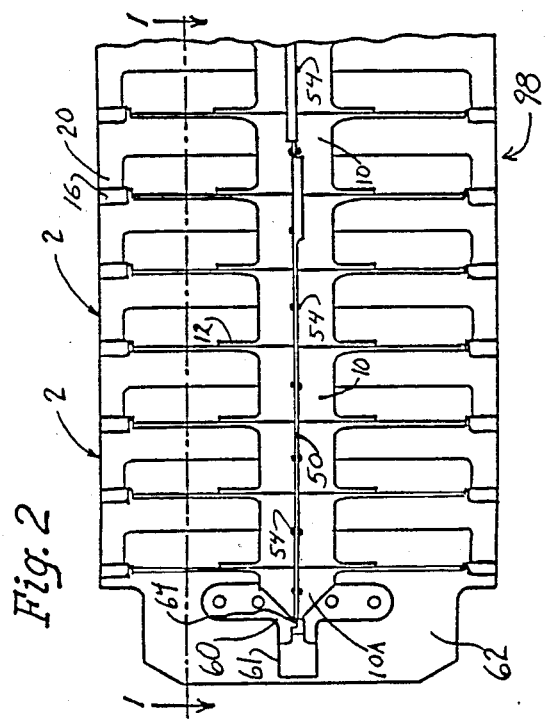
FIG. 2 is a bottom view of the forward part of the divergent seal flap shown in FIG. 1.
Figure 1:
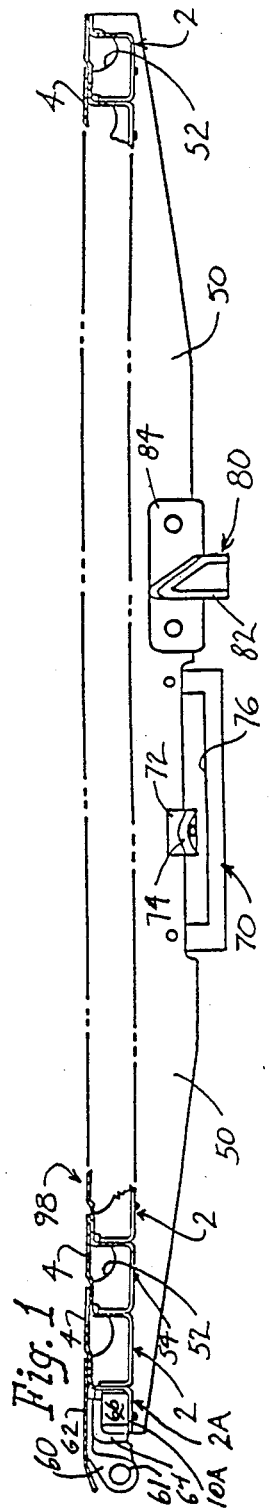
FIG. 1 is a longitudinal view taken through a divergent seal flap along the line 1—1 of FIG. 2 showing the T-bar in full.
Figure 9:
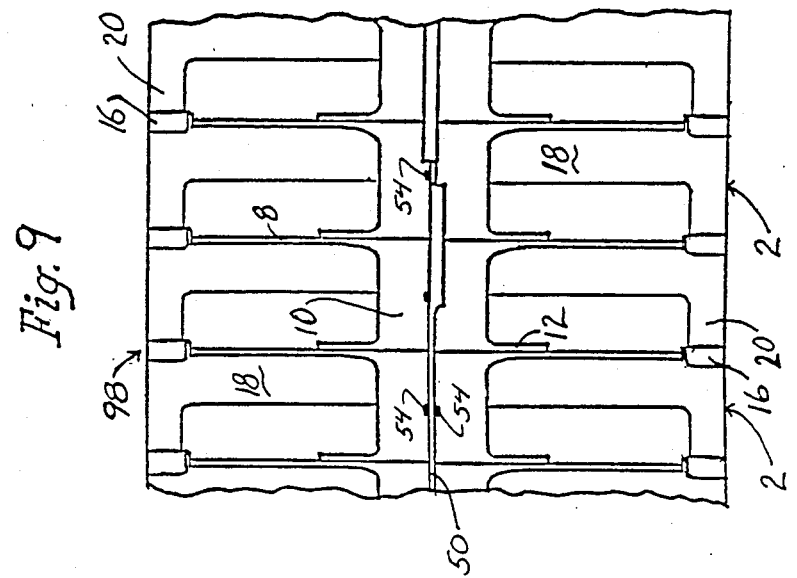
FIG. 9 is an enlarged view of a portion of FIG. 2 showing the mating contours of the plate members of the louver elements.

Referring to FIG. 1, a divergent seal flap 98 of a jet engine flap-type exhaust nozzle is constructed from a plurality of sheet metal louver elements 2 extending along the length of the flap 98. While a divergent seal flap 98 is shown formed of this construction, the other flaps of a convergent/divergent nozzle can be formed of a longitudinal series of louver elements 2, if desired. A flap-type exhaust nozzle having converging and diverging nozzle flaps, with cooperating converging and diverging seal flaps, is shown in U.S. Pat. No. 4,544,098, incorporated by reference. A simplified exhaust nozzle is shown in U.S. Pat. No. 3,730,436 and interconnected nozzle flaps and seal flaps are shown in U.S. Pat. No. 3,794,244.

Figure 8:
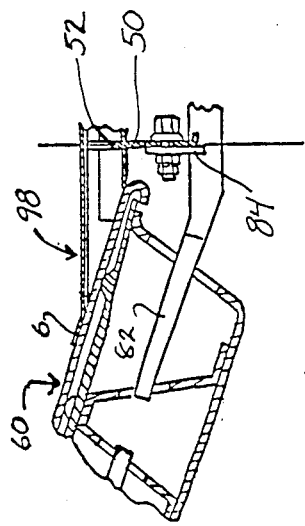
FIG. 8 is a view taken through a portion of a divergent seal flap and a mating portion of a divergent nozzle flap just rearwardly of the T-bar mounting looking forwardly, showing the T-bar and mount in full.

A sheet metal single louver element 2 comprises a U-section at its forward end, said U-section having a forward leg 12, bottom portion 10, and rearward leg 8; a plate member 4 extends rearwardly from the end of the rearward leg 8 at the open end of the U-section. The rearwardly extending plate member 4 is formed of a width so that its outer ends 6 will contact the inner surface of adjacent nozzle flaps 60 at the maximum opening position of the nozzle flaps; the ends 6 of the rearwardly extending plate member 4 being angled inwardly to form the best mating configuration for contacting the inside of the adjacent nozzle flaps 60 (see FIG. 8).

The rearward leg 8 of the U-section extends outwardly, from between angled ends 6, as a flange from the forward edge of the rearwardly extending plate member 4 with its side edges extending toward each other, at approximately the same angle as the angled ends 6. The side edges of rearward leg 8 taper until they reach the side edges of a forwardly extending bottom portion 10. In a construction built, the width of the bottom portion 10 was approximately one-fifth(1/5) of the width of the rearward leg 8, between angled ends 6. This bottom portion 10 extends forwardly to the outer end of the forward leg 12 and forward leg 12 extends inwardly a distance less than the length of the rearward leg 8, for a purpose to be hereinafter described.

In a construction built, the length of the forward leg 12 was approximately three-quarters (¾) of the length of the rearward leg 8. The forward leg 12 extends inwardly as a flange from the forward edge of the bottom portion 10 with its side edges extending away from each other, at approximately the same angle as the side edges of the rearward leg 8. The side edges of forward leg 12 taper until they reach a width that will provide an adequate surface to engage the adjacent rearward surface 8 of an adjacent louver element 2 so as to be fixed thereto. In a construction built, the widest part of the forward leg 12 was a little less than one-half (½) of the widest part of the rearward leg 8.

Each rearwardly extending plate member 4 has its inner forward surface 18 slightly recessed at 14, to accommodate the thickness of the sheet metal of the plate member 4, between angled ends 6 for approximately one-third (⅓) of its length from its forward end. Each rearward portion of each angled end 6 is slightly raised at 16, said raised portion extending into the adjacent flat surface 18 of the rearwardly extending plate member 4.

It can be seen that when two single louver elements 2 are placed together to form a flap, the forward leg, or inwardly extending flange 12 of one element 2 is placed against the rearward leg, or outwardly extending flange 8 of the second element 2; the connecting plate 10 being shorter than rearwardly extending plate member 4 so that the rear end of flat surface 18 of the rearwardly extending plate member 4 between the raised end portions 16 mates with the recessed portion 14 of the forward end of the rearwardly extending plate member 4 of the second element between the angled ends 6; the raised portions 16 fitting over the forward part 20 of the ends 6.

While a divergent seal flap 98 can be made of a various number of single louver elements 2, in a construction built where a flap was approximately 16 inches long (45.72 cm), nineteen (19) flaps were used. To form a continuous beam lengthwise in the center of the divergent seal flap 98, a central cut, or slot, 30, is placed through the forward leg, or inwardly extending flange, 12, bottom portion 10, and rearward leg, or outwardly extending flange, 8 of the U-section of each single louver element 2, said cut, or slot, entering the rearwardly extending plate member 4 just where it contacts the rearward leg, or outwardly extending flange, 8.

To form a divergent seal flap 98 of a desired length, knowing the louver element 2 size, a series of louver elements 2 are placed together, as mentioned hereinbefore, with the inwardly extending flanges 12 placed against the outwardly extending flanges 8 with the slots 30 all aligned, and welded, such as by a plurality of spot welds 32 between each flange 12 and 8.

Figure 7:
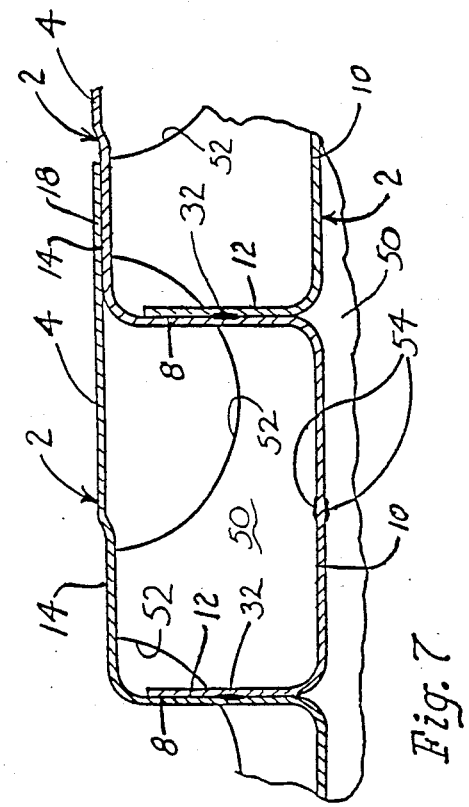
FIG. 7 is an enlarged sectional view showing the connection of single louver elements together and with the beam plate.

A beam plate 50 is placed along the aligned slots 30 from one end of the series of louver elements 2 to the other for the entire length of the divergent seal flap 98. As is well known, the inner surface of the divergent seal flap 98 directly encounters the hot gas flow from the jet engine while the outer side encounters a cooler environment, thereby placing thermal stresses in the divergent seal flap 98. In this flap construction, when the series of louver elements are nested and welded together, some of the inner wall is formed of a single thickness while some is formed of a double thickness. FIG. 7 shows the single wall in the center of the plate member 4, while the overlapping of the rear end of flat surface 18 of one louver element and the recessed portion 14 of the forward end of the adjacent louver element 2 shows a double wall. To reduce the transfer of heat into the beam plate 50, the beam plate 50 has a plurality of scallops, or semi-circular cuts 52, along its length, under each single wall section. The heat absorbed by the louver plate members 4 will travel the sheet metal to flanges 8 and then to flanges 12 and bottom portions 10. This louver arrangement divides the tendency of a single bow into a plurality of small bows.

With the scallops, or semi-circular cuts, 52 in place, the bottom portions 10 are welded on each side to the beam plate 50, such as by tack welds 54. These welds and the welds between flanges 8 and 12 structurally connect the louver elements 2 together and to the beam plate 50. The plate members 4 only rest one on the other with no connecting means therebetween. The louver elements 2 are further brazed where they are welded, between flanges 8 and 12, as is the contact between the beam plate 50 and the U-section thereof, with care taken to insure that the plate members 4 are not affected. The movement of the plate member 4 must remain separate to provide for separate thermal growth and provide for flow between the louver plate members 4.

The divergent seal flap 98 shown in FIG. 1 is formed at its rearward end by merely being cut through the double walled section of two louver elements 2 and the full section of the beam plate 50. These plate member end portions are welded together and to the end of the beam plate 50 for rigidity.

The forward end of the divergent seal flap 98 is formed by cutting the forward flange 12 off of the leading louver element 2A and angling in the sides of the bottom portion 10A to the front end of the beam plate 50. A bracket 60 having a pivot connection 61, is spot welded to a forward plate 62 which covers the bracket 60 and has a rearward end shaped like the rearward end of a plate member 4 to engage the forward end of the plate member 4 of the leading louver element 2A. A flange 64 on bracket 60 extends rearwardly and is welded to the forward part of beam plate 50 including the use of an angle bracket 66.

The beam plate 50 has a seal flap centering means 70 and retaining means 80. The centering means 70 has a slider member 72 with outwardly extending flanges 74 mounted for movement in a track 76. Links (not shown) connect each flange 72 to the side of a cooperating nozzle flap. A T-bar 82, with a mounting plate 84, is fixed to the beam plate 50. The T-bar 82 has a sidewardly projecting arm for positioning in an opening in the side of a nozzle flap 60 to prevent the seal flap 98 from lifting off. A seal centering and retaining means which can be used is shown in U.S. Pat. No. 3,794,244.

I claim:

1. An exhaust nozzle flap structure having an inner hot flow directing side, said structure including a longitudinal series of louver elements extending along a longitudinal axis of said flap structure; said louver elements each having a U-section at its forward end; said U-section having an integrally connected forward leg, bottom portion, and rearward leg; a plate member extending rearwardly from the rearward leg at an open end of the U-section; said forward leg of each U-section being located against the rearward leg of each forward adjacent U-section and fixed thereto; each plate member extending rearwardly over the open end of a rearward adjacent U-section and over at least a portion of the plate member of the rearward adjacent U-section, said plate members forming the inner hot flow directing side; beam means extending longitudinally along said U-sections and fixed thereto.

2. A flap structure as set forth in claim 1 wherein each plate member extends over the forward part of a rearward adjacent plate member, a remaining rearward part of the rearward adjacent plate member forming a part of the hot flow directing side for contacting and directing a hot flow, said plate members having free movement with respect to each other to permit thermal growth therebetween.

3. A flap structure as set forth in claim 2 wherein said adjacent plate members form a double thickness of the inner hot flow directing side where each plate member extends over the forward part of the rearward adjacent plate member.

4. A flap structure as set forth in claim 3 wherein each plate member forms a single thickness of the inner hot flow directing side between the rearward part of the forward adjacent plate member and the rearward leg of its own U-section.

5. A flap structure as set forth in claim 4 wherein said bottom portion is a connecting plate; said forward leg, connecting plate and rearward leg having a longitudinally extending slot therethrough; said slots of each louver element being aligned, said beam means being an elongated plate fixed in said aligned slots of said louver elements.

6. A flap structure as set forth in claim 5 wherein said elongated plate is scalloped along its length adjacent the inner hot flow directing side where it is a single thickness to isolate the plate members from the elongated plate.

7. A flap structure as set forth in claim 1 wherein said bottom portion is a connecting plate; said forward leg, connecting plate and rearward leg having a longitudinally extending slot therethrough; said slots of each louver element being aligned, said beam means being an elongated plate fixed in said aligned slots of said louver elements.

8. A flap structure as set forth in claim 7 wherein said elongated plate is scalloped along it length adjacent the inner hot flow directing side where it is a single thickness to isolate the plate members from the elongated plate.

9. A flap structure as set forth in claim 1 wherein said longitudinal series of louver elements are identical.

* * * * *